April 4, 1939.    F. W. BURGER    2,152,757
WHEEL ASSEMBLY
Filed May 22, 1936
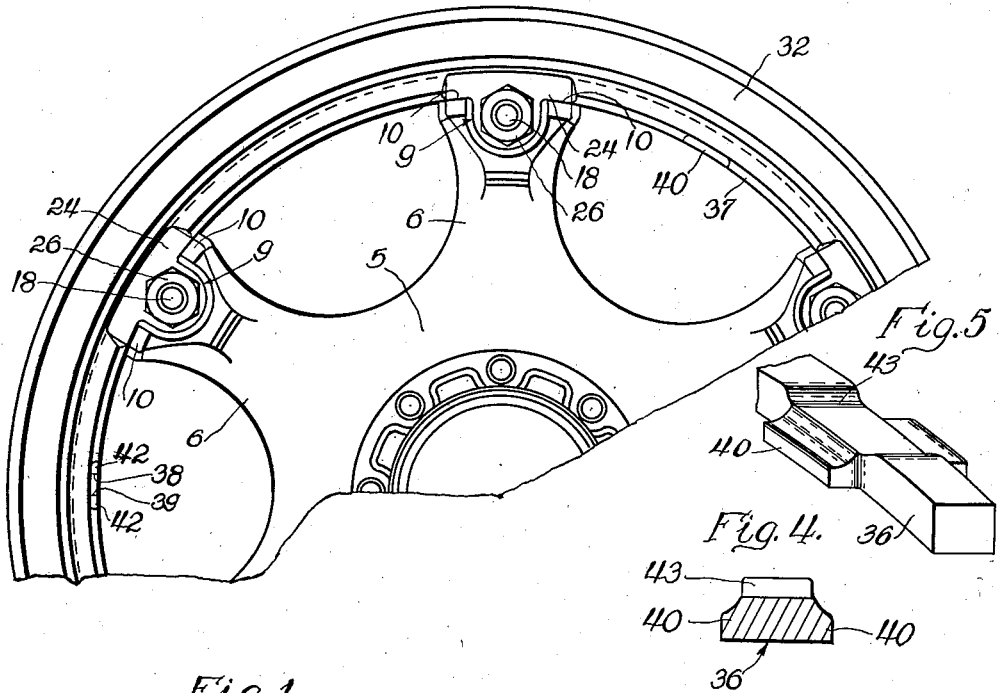
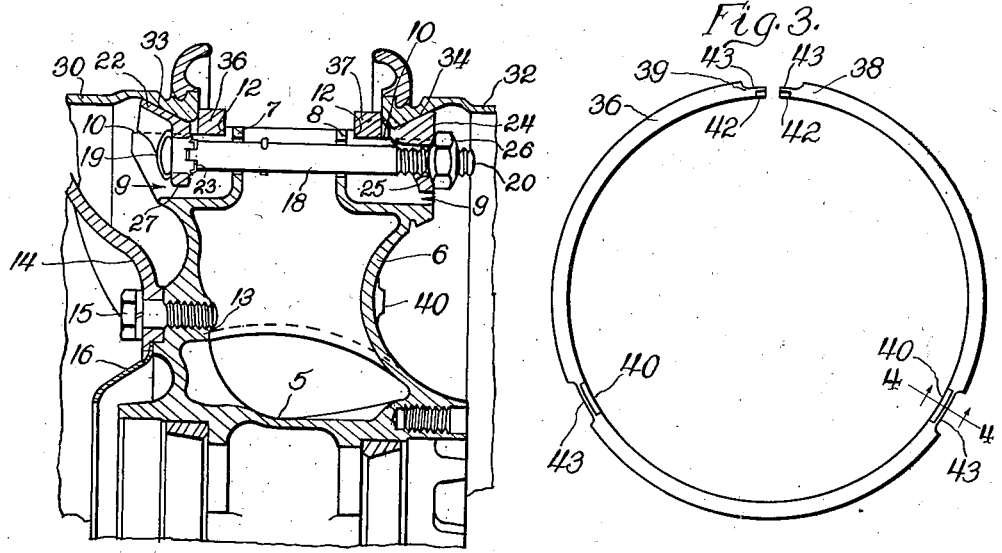
Inventor:
Frederick W. Burger
By Brown, Jackson, Boettcher & Dienner
Attys.

Patented Apr. 4, 1939

2,152,757

UNITED STATES PATENT OFFICE 2,152,757

WHEEL ASSEMBLY

Frederick W. Burger, Niles, Mich., assignor to Clark Equipment Company, Buchanan, Mich., a corporation of Michigan Application May 22, 1936, Serial No. 81,237

7 Claims. (Cl. 301—13)

The present invention relates to wheel assemblies, and more particularly is directed to the provision of a novel type of spacing means for wheels of the central abutment type adapted to carry two tire rims.

With the advent of dual wheels for trucks and other heavy types of automotive vehicles, it has become increasingly important to provide means for definitely spacing and locating the tire rims on the wheel spider and maintaining these rims in fixed alined position on the spider under normal driving conditions. In the case of certain types of dual wheel assemblies, the inboard rim has been wedged on to tapered shoulders at the inboard side of the wheel by the use of an annular channel-shaped spacing member or individual spacing blocks at the spoke ends which have abutting engagement between the adjacent lateral edges of the tire rims, and which move axially inwardly when clamping pressure is applied to the outboard rim.

However, with the use of the central abutment type of wheel spider, in which radial shoulders at each spoke end form annular abutments for limiting movement of the rims toward each other, it is necessary to provide some type of spacing means which not only will maintain the rims in positive alinement, but due to the fact that the internal diameter of the rim must be greater than the diameter of the radial abutments, the spacing means must be such as to prevent the outboard rim from moving over the abutment. Thus, the spacing means must have a radial extent such that it will be engaged by the lateral edge of the rim and yet will have abutting engagement with the abutment shoulders to prevent inward movement of the outboard rim. At the same time, the spacing means must be so constructed that it can be expanded or otherwise moved over the abutment and then snapped into position such as to fit against the inboard shoulders to prevent outboard movement of the inner rim.

The present invention contemplates a design of spacing members which will be capable of use on the central abutment type of spider, and which can be readily moved into proper position on either side of the abutment shoulders when the spider is mounted on an axle or the like. Also, the present invention essentially provides spacing means which has relatively tight planar engagement with the abutment shoulders on both the inboard and outboard side of the abutments and which can be readily removed from the outboard side of the wheel.

The primary object of the present invention is to provide a ring-like spacing member capable of a certain amount of expansion so that it can be moved over the central abutment and which then resiliently contracts so as to have positive abutting engagement with the inboard shoulder.

Another object of the present invention is to provide a spacing member which is capable of initially centering the rim with respect to the spider and holding the rim in centered position while the wedging clamps are being drawn up into position to force the rim against the spacing member and to chord the rim radially.

Still another feature of the present invention is the provision of a split ring type of spacing member which requires no interlocking latches or hooks at the adjacent ends in order to hold the same in position on the spider.

One of the advantages secured by the present construction resides in the fact that the design of the spacing member is such that it can be formed from standard rolled stock, and requires no machining of the engaging faces. In order to provide the alinement feature for centering the rim, the spacing member is subjected to a series of upsetting operations which form circumferentially spaced ears or lug portions projecting laterally from opposite sides of the member, whereby the rim will be centered upon these lug portions which, in turn, are centered on the axially extending shoulders leading outwardly from the radially extending abutment surfaces.

I am aware that certain types of annular spacing rings have heretofore been provided, but the disadvantage with previous types of such rings, if they were not of the continuous type, was that latching means had to be provided to prevent the ring from radial spreading out of position between the rim and the abutment shoulders, thereby loosening the entire assembly, and such rings were not capable of economical production in mass quantities at a cost such as is now possible. The present invention obviates this difficulty by providing a ring which requires no fastening at the split ends, and yet cannot escape from its position under any driving conditions, due to the fact that the lug portions of the ring are clamped under the rim and thus are restricted against any radial outward movement.

Another feature of the present invention is the provision of spacing rings of this type having a substantially uniform cross-sectional area and which can be formed economically and rapidly without any extensive machine operations.

These and other advantages of the present invention will appear more fully from the following detailed description, taken in conjunction with the accompanying drawing, which will disclose to those skilled in the art the particular construction and operation of a preferred form of the present invention.

In the drawing:

Figure 1 is a sectional view of a spoke end showing the use of the present type of spacing means on a wheel of the central abutment type;

Figure 2 is a partial elevational view of the wheel shown in Figure 1;

Figure 3 is an elevational view of the spacing ring;

Figure 4 is a sectional view taken substantially on line 4—4 of Figure 3; and

Figure 5 is a perspective view of a portion of the ring showing one of the lugs.

Referring now in detail to the drawing, a wheel spider is indicated at 5 and is provided with hollow radially extending spokes 6, although if desired, the spokes may be opened at their back end. It is to be understood that the wheel spider shown is illustrative only of a class of spiders which could be employed in the present invention and is described in detail only as showing an illustrated embodiment of the invention.

At the radial outer end of each of the spokes, there is provided the two transverse walls 7 and 8 which form the inner walls for alined transverse semi-cylindrical sockets 9 extending outwardly from the center plane of the wheel. Each of the sockets 9 has defining walls terminating in axially extending spaced shoulders 10, which, adjacent the walls 7 and 8, are provided with radially extending abutment shoulders 12 disposed axially outwardly of the transverse walls 7 and 8.

At its inboard side, the wheel spider is provided with suitably machined bosses 13 which are adapted to form alining and locating seats for the head flange 14 of a brake drum which is secured on the bosses 13 by means of the bolts 15. Clamped between the brake drum 14 and the rear wall of the spokes is the brake shield plate 16.

Extending through suitable alined apertures in the walls 7 and 8 is a clamping bolt 18 having a head 19 at one end thereof, and having the threaded projecting portion 20 at the opposite end thereof. Mounted on the bolt adjacent the head 19 is a clamping lug 22 of the type shown generally in my Reissue Patent No. 19,885, of March 10, 1936. The lug 22 is held in fixed position on the shank of the bolt by the punched-out portions 23 in the bolt surface which prevent the lug 22 from having any axial movement with respect to the bolt. This is to prevent the lug from rattling when only a single rim is mounted on the wheel, and also serves to insure proper positioning of the lug when the bolt is passed through the walls 7 and 8. At its opposite end, the bolt 18 is adapted to slidably receive the lug 24 which has a depending apertured shank 25 freely movable in the socket 9 and urged axially inwardly of the bolt by means of the clamping nut 26. In a similar manner the lug 22 has a depending shank 27 which is freely movable within the socket 9 at the inboard side of the spider when the nut 26 is tightened onto the threaded portion 20 of the bolt.

I have preferred to illustrate my invention in connection with the employment of what may be termed a semi-drop-center rim, and illustrate the two rims 30 and 32 as being of this type, although it is to be understood that any bevel edge mounted type of rim may be employed.

Each of the rims 30 and 32 is provided with the beveled edge surfaces 33 and 34, respectively, adapted to have wedging engagement with corresponding tapered surfaces on the outer sides of the lugs 22 and 24.

Interposed between the shoulders 12 of the spoke end and the lateral edges of the rims 32 and 30, I provide spacing rings 36 and 37 of generally rectangular section and which are of a diameter such that the inner face thereof engages about the periphery of the shoulders 10 while the outer face thereof extends radially outwardly to provide sufficient bearing contact between the lateral edges of the rims 30 and 32 and the lateral faces of the spacing members.

Considering now the ring members in more detail, attention is directed to the detailed showing of one of these members in Figures 3 and 4. The ring member, such as the member 36 of Figure 4, is a split ring having adjacent ends 38 and 39. These rings are preferably formed from cold or hot rolled stock which is wound upon a suitable mandrel and then cut longitudinally to provide a plurality of ring members. The surfaces of the members are preferably either galvanized or cadmium plated for protection against rusting and the like.

The rings thus formed are subjected to a series of upsetting or pinching operations which form laterally projecting tongues or lug portions 40 at spaced intervals about the inner face of the ring and also forms a pair of said projections indicated at 42 at each of the ends 38 and 39 of the ring. The operations which perform this movement or displacement of metal to provide the lateral projections do not vary the cross sectional area of the ring at these points but change the shape of the ring as indicated in the sectional view of Figure 4 providing a depressed portion 43 radially outwardly of the lateral projections 40 and 42.

In a preferred embodiment of the invention, these projections are disposed equidistantly about the circumference of the ring, and preferably, three sets of such projections are provided spaced 120° apart. The ring is mounted about the periphery of the shoulders 10 of the spider with the lateral projections 40 and 42 being disposed intermediate adjacent pairs of spokes as shown in Figure 2.

In assembling the dual wheel construction shown in Figure 1, the inboard rim 30 is first passed over the spokes 6 of the spider and moved to a position about the shoulders 10 defining the sockets 9. This is readily accomplished due to the fact that the internal diameter of the beveled portion 33 of the rim 30 is larger than the circumference of the wheel spider including the radial abutments 12. When this rim has been moved to this position, the ring 36 is expanded slightly and is passed over the central abutments of the spider 5 into the position shown in Figure 1, in which position, the ring seats radially against the inboard abutment surfaces 12 and rides upon the axially extending shoulders 10 of each of the spokes. The ring itself is formed of material having some degree of resilience so that it can be sprung apart to pass over the abutments, but will then tend to contract into the position shown. This disposes the lateral projections 40 and 42 intermediate adjacent pairs of spokes, and the innermost surface of the beveled edge 33 of the rims 30 engages the radial outer surfaces of the projections 40 and 42 to aline the rim initially in centered position on the spider. Of course, it is to be understood that the bolt 18, with the lug 22 secured adjacent the head thereof, has been inserted into position prior to the position of the rim 30 and the ring 36.

The ring 37 is next assembled into position over the outboard shoulders 10 and moved axially inwardly into radial abutting engagement with the shoulders 12. The ring 37 may be of the same type of construction as the ring 36, that is, a split ring so that it can be used either on the inboard or the outboard side of the wheel. With the ring 37 in position, the outboard rim 32 is moved into lateral abutting engagement therewith and, at the same time, is initially centered by the engagement of the internal surface of the beveled edge 34 with the lateral projections 40 and 42 of the ring. The lugs 24 are then placed in position with the shanks 25 thereof engaging over the outer ends of the bolts 18, and the nut 26 is then threaded onto the end of the bolt. Upon tightening of the nut 26, the bolt 18 is urged axially outwardly of the spider and simultaneously, the lug 24 is urged axially inwardly of the spider. Each of the lugs 22 and 24 has laterally spaced seating surfaces riding on the shoulders 10 and serving to transmit the loads on the rims 30 and 32 directly to the spider through these shoulders and the walls of the sockets 9. Upon axial inward movement of the lugs 22 and 24, the rims 30 and 32 are simultaneously carried axially inwardly into firm abutting engagement with the rings 36 and 37. This positively aligns rims 30 and 32 in fixed vertical planes with respect to the wheel spider 5 and also in definite spaced relation, due to the spacing between the shoulders 12 and the thickness of the rings 36 and 37. Further tightening of the nut 26 results in radial chording of the rims in fixed wedged engagement with the spoke ends of the spider. At the same time, due to the fact that the projections 40 and 42 are intermediate the spokes, the lugs 22 and 24 have free movement axially into the sockets 9. The outboard ring may, of course, be a continuous type of ring with no split, if so desired, although for practical purposes both rings are split to afford interchangeability.

Another important function of the projections 40 and 42 of the rings 36 and 37, in addition to the initial centering of the rims 30 and 32 prior to tightening of the wedging clamps 22 and 24, resides in the fact that after the rims have been chorded into final position, the engagement of the projections 40 and 42 with the annular surface of the beveled edges 33 and 34 presents an outward radial movement of the rings which would tend to displace them from their proper position between the rims and the abutments 12. This also eliminates the need of an interlocking or latching engagement between the ends of the rings since the rings are held in fixed position against radial expansion by this engagement of the projections 40 and 42. Thus when the wheels are being driven through gravel, mud or the like, there is no chance for the rings to be pulled radially outwardly and dislodged from their proper position.

Inasmuch as the rings can be formed of standard rolled stock and the operations to form the projections 40 and 42 can be easily and quickly accomplished, the rings are of inexpensive construction and capable of mass production. It will further be noted that the lugs 22 and 24 are disposed radially inwardly of the outer circumferential limit of the rings whereby substantially a straight line axially thrust upon the rings through the lateral edges of the rings 30 and 32 is produced, which eliminates any tendency towards forcing the rings out of position during clamping of the rims to the spider.

I am aware that the rings may be formed in various manners, and I do not intend to be limited to the described method of formation, nor to the particular shape and displacement produced in forming the projections 40 and 42. The rings may also be employed to provide the same advantages of initial centering of the rims and elimination of the hooking or latching devices at the adjacent ends of the rings in wheel spider constructions other than that described and illustrated.

The invention is therefore not to be limited to the exact details shown and described, but only insofar as defined by the scope and spirit of the appended claims.

I claim:

1. In combination, a wheel spider having radially extending spokes provided at their outer ends with central radially extending abutments, tire rims adapted to be mounted on said spoke ends on opposite sides of said abutments, and spacing rings having parallel radial faces for lateral engagement between said rims and said abutments and having spaced lateral projections under said rim for initially centering said rims on said spider.

2. In combination, a wheel spider having radially extending spokes provided with central radial abutments at their outer ends, tire rims adapted to be mounted on said spoke ends, clamping means on said spoke ends for urging said rims radially outwardly and axially inwardly toward each other and spacing rings having planar radial faces engaging said abutments on opposite sides thereof for limiting axial inward movement of said rims, said rings having means initially centering said rims thereon and disposed out of the path of movement of said clamping means intermediate said spokes.

3. The combination with a dual wheel assembly comprising a central abutment type wheel spider having clamping means for mounting a pair of tire rims thereon, of split spacing means having parallel radially abutting engagement on opposite sides of the central abutment and having lateral abutting engagement with said rims upon tightening of said clamping means, and circumferentially spaced means on said spacing means having radial engagement under said rims for aligning said rims on said spider, said rims preventing radial expansion of said spacing means.

4. A spacer ring for a wheel of the class described, comprising a ring-like piece of stock of substantially uniform rectangular cross-section having circumferentially spaced integral lug portions extending laterally on opposite sides of the radial faces thereof at the inner periphery of said ring, the radial thickness of the ring being reduced at said lug portions.

5. A spacer ring comprising a rectangular sectioned ring split to provide mounting of said ring on the inboard side of a central abutment type wheel, said ring having pairs of opposite laterally extending integral projections spaced circumferentially about said ring.

6. A spacer ring comprising an annular member of substantially square cross-section having circumferentially spaced portions punched out to form laterally extending lug portions projecting outwardly from the radial faces of said ring, the radial thickness of the ring being reduced at each of said portions while the cross-sectional area remains the same.

7. A spacer ring of the class described comprising a split ring having a substantially uniform cross-sectional area, the ends of said ring and spaced portions on the circumference thereof being upset to form extending lateral projections.

FREDERICK W. BURGER.